(12) United States Patent
Graham et al.

(10) Patent No.: US 10,712,971 B2
(45) Date of Patent: Jul. 14, 2020

(54) WRITE COMMANDS FILTERING

(71) Applicant: HEWLETT-PACKARD DEVELOPMENT COMPANY, L.P., Houston, TX (US)

(72) Inventors: Christoph J Graham, Houston, TX (US); Thomas J Flynn, Houston, TX (US); Virginia Q Herrera, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/757,383

(22) PCT Filed: Oct. 23, 2015

(86) PCT No.: PCT/US2015/057116
§ 371 (c)(1),
(2) Date: Mar. 5, 2018

(87) PCT Pub. No.: WO2017/069773
PCT Pub. Date: Apr. 27, 2017

(65) Prior Publication Data
US 2018/0246672 A1    Aug. 30, 2018

(51) Int. Cl.
*G06F 3/00* (2006.01)
*G06F 3/06* (2006.01)
(Continued)

(52) U.S. Cl.
CPC .......... *G06F 3/0659* (2013.01); *G06F 3/0604* (2013.01); *G06F 3/0616* (2013.01); *G06F 3/0679* (2013.01); *G06F 9/30* (2013.01); *G06F 12/02* (2013.01); *G06F 12/0868* (2013.01); *G06F 13/00* (2013.01); *G06F 12/0246* (2013.01); *G06F 2212/1016* (2013.01); *G06F 2212/214* (2013.01); *G06F 2212/281* (2013.01)

(58) Field of Classification Search
None
See application file for complete search history.

(56) References Cited

U.S. PATENT DOCUMENTS

2007/0101079 A1    5/2007    MacIntyre et al.
2007/0180186 A1    8/2007    Cornwell et al.
(Continued)

FOREIGN PATENT DOCUMENTS

CN    WO-2009023594 A2    2/2009
CN    103150136 A    6/2013
(Continued)

OTHER PUBLICATIONS http://www.storage-switzerland.com/Blog/Entries/2011/9/27_Advancing_The_State_Of_Solid_State_Caching.html.
Po-Liang, Wu et al., "A File-System-Aware FTL Design for Flash-Memory Storage Systems", Jan. 7, 2009.

*Primary Examiner* — Reginald G Bragdon
*Assistant Examiner* — Michael L Westbrook
(74) *Attorney, Agent, or Firm* — Rathe Lindenbaum LLP (57) ABSTRACT

In an example method, write commands for a solid-state storage medium having storage region are received. Selected write commands are filtered out according to criteria. The selected write commands are cached. Writing pursuant to the selected write commands is aggregated to within boundaries of one of the storage regions of the storage medium.

17 Claims, 5 Drawing Sheets

(51) Int. Cl.
*G06F 9/30* (2018.01)
*G06F 12/02* (2006.01)
*G06F 13/00* (2006.01)
*G06F 12/0868* (2016.01)

(56) References Cited

U.S. PATENT DOCUMENTS

| | | |
|---|---|---|
| 2009/0094391 A1 | 4/2009 | Yim |
| 2010/0199033 A1 | 8/2010 | Nguyen et al. |
| 2011/0119442 A1 | 5/2011 | Haines |
| 2012/0011314 A1* | 1/2012 | Yochai ................. G06F 1/3268 711/113 |
| 2012/0311263 A1 | 12/2012 | Kamath et al. |
| 2015/0113204 A1 | 4/2015 | Lochen |
| 2016/0147446 A1* | 5/2016 | Ghosh .................... G06F 3/061 711/103 |
| 2016/0170887 A1* | 6/2016 | Jafri ................... G06F 12/0833 711/135 |

FOREIGN PATENT DOCUMENTS

| | | |
|---|---|---|
| CN | 103703450 A | 4/2014 |
| CN | 103793181 A | 5/2014 |
| JP | 2008108026 A | 5/2008 |
| TW | 201435729 A | 9/2014 |
| TW | 201520793 A | 6/2015 |

\* cited by examiner

WRITE COMMANDS FILTERING

BACKGROUND

Solid-state storage devices, such as NAND-type flash memory devices, have predefined storage regions. During each write cycle, an empty erased storage region is written upon. When data is to be written to a previously stored file in a first storage region, the first storage region is erased and previously recorded file, along with additional data being added by the write operation, is written to a second unwritten upon or previously erased storage region. Such solid-state storage devices have an expected life of a limited number of write operations or cycles.

DETAILED DESCRIPTION

Figure 1:
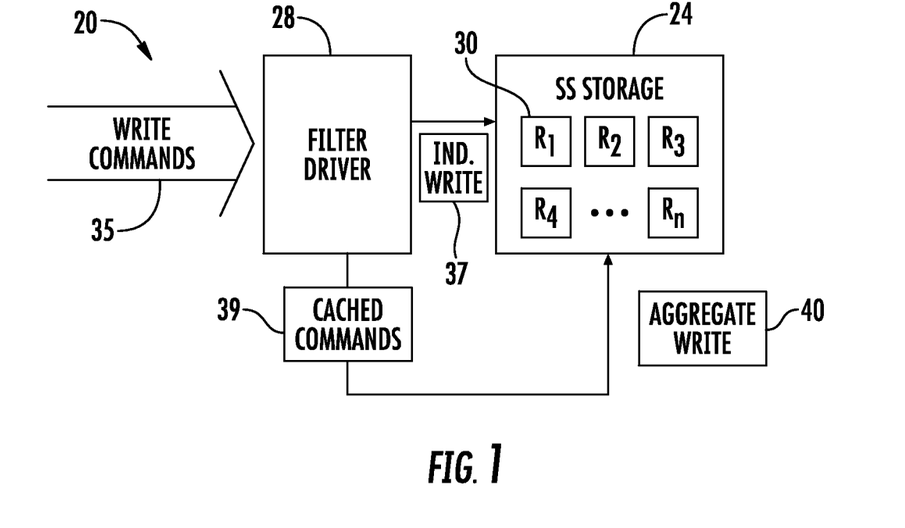
FIG. 1 is a schematic diagram of an example solid-state storage system for write command filtering.

FIG. 1 schematically illustrates an example solid state storage system 20 that manages use of a solid-state storage medium. Solid-state storage mediums include multiple individual storage regions having predefined sizes. During an individual write cycle, data is written to an empty or previously erased storage region. When new data is to be appended to previously written data, the previously written data and a new data are both written to a new storage region, whereas the old storage region containing the previously written data is erased. This cycle is repeated each time data is added to previously written data file. Solid-state storage mediums have physical limitations as to how many times a storage region can be erased before for it is unable to reliably hold charge for a substantial time duration.

System 20 mitigates or reduces wear of the solid-state storage medium by reducing the total number of write cycles that are carried out for a given quantity of data stored by the solid-state storage medium over time. Using predefined criteria, system 20 filters out a subset of the total number of write commands received for subsequent aggregated writing. During the aggregated writing, data is written pursuant to the entire subset of commands in a single storage region. Rather than each storage region accommodating data from just a single write command, some storage regions may accommodate data from multiple write commands. By utilizing a larger portion of each storage region, system 20 reduces the total number of erasures and write cycles for a given quantity of data and prolong the life of the solid-state storage medium.

In one implementation, system 20 discerns between write commands that are best suited for immediate writing to a storage region and write commands that are good candidates for storing or caching, along with other write commands, for a subsequent aggregate write to an individual storage region. In one implementation, system 20 selects write commands for caching based upon the size of data be written pursuant to the write commands. The size of the data to be written pursuant to the write command includes new data and, in the case where the new data is to be appended to a file in a previously used storage region, the existing data in the file, where the existing data is copied and rewritten together with the new data into an unused or erased storage region. In another implementation, system 20 selects write commands for caching based upon whether the write commands are related to write commands already residing in the cache. In one implementation, system 20 selects write commands based upon a combination for a weighted combination of both the size of the data to be written pursuant to the write command and how related the particular write command is to other write commands already residing in the cache. In yet other implementations, other criteria may be utilized.

As schematically shown by FIG. 1, system 20 comprises solid-state storage medium 24 and filter driver 28. Solid-state storage medium 24 comprise a solid-state storage medium, a medium where data is stored electronically rather than magnetically. Solid-state storage medium 24 comprises multiple predefined storage regions 30 ($R_1$-$R_n$). Each individual predefined storage region 30 comprises the smallest unit or region of the storage medium may be individually acted upon during a single write cycle. For example, in some implementations, memory is defined by cells which are grouped into pages which are grouped into blocks, where read and write operations are page oriented but where erase operations apply to entire blocks. In such an implementation, the smallest unit of memory that may be acted upon in a single write cycle is a page. In such an implementation, system 20 manages the writing of data so as to fill a larger percentage of each page by writing data pursuant to multiple write commands in each page. In other implementations, solid-state storage medium 24 may have other sized storage regions 30. In one implementation, solid-state storage medium 24 comprises a nonvolatile solid-state storage medium such as NAND flash memory.

Filter driver 28 comprises a processor and associated processor instructions that manage how received write commands are executed with respect to sold-state storage medium 24. In the example illustrated, filter driver 28 carries out the example method 100 of FIG. 2. As indicated by block 104 of 2, filter driver 28 receives write commands 35 writing data to solid-state storage medium 24 having storage regions 30. In one implementation, filter driver 28 receives such write commands 35 from a file system driver of an operating system. In one implementation, such write commands are queued before being received by filter driver 28.

Figure 2:
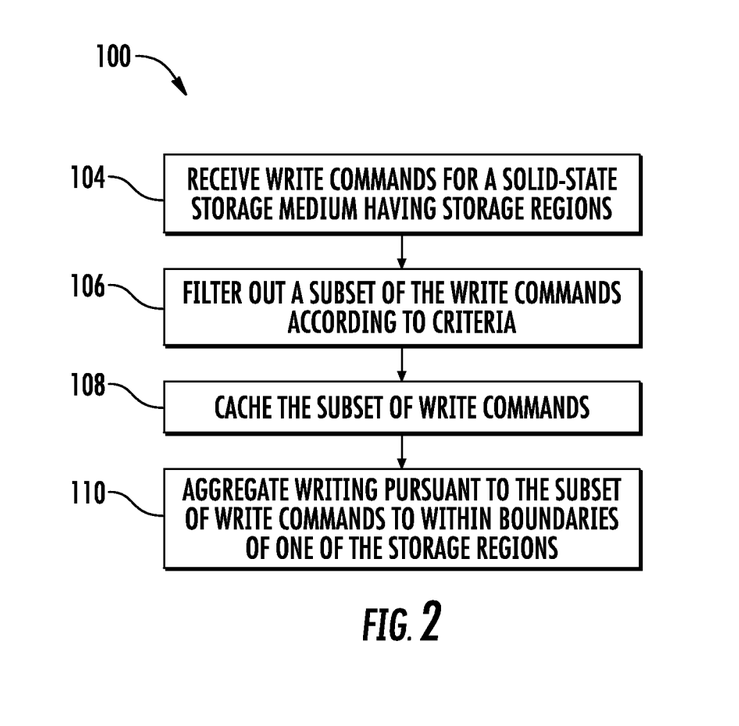
FIG. 2 is a flow diagram of an example solid-state storage method for filtering write commands.

As indicated by block 106, filter driver 28 filters out a subset of the received write commands according to predefined criteria The criteria used by filter driver 28 to filter out the subset of write commands is criteria that identifies those particular write commands that are good candidates for being aggregated or coalesced together in execution such that the data written pursuant to such aggregated write commands 40 is written to a single storage region, within the boundaries of a single storage region 30, during a single write cycle. In one implementation, the criteria is chosen so as to distinguish between (A) write commands that individually request writing of large quantities of data that will more fully utilize a single storage region versus write commands that individually request writing of smaller quantities of data that individually utilize a smaller portion of single storage region, but when aggregated with the data of other write commands during a single write cycle, more fully occupy or utilize the single storage region and/or (B) write commands that are unrelated to one another and less likely to be part of the same file or related files versus write commands that are related to one another such that the data requested to be written by the write commands are more likely to be part of the same file or related files.

In one implementation, system 20 utilizes other criteria for selecting those write commands that are to be cached for a subsequent aggregate write to a single storage region. For example, in other implementations, system 20 may base the selection of write commands upon other characteristics of the write commands or other pending or historical I/O commands comprising both read and write commands that tend to indicate the size of the associated data, how the associated data may already be related to data in the cache or the appropriateness for caching such write commands. For example, system 20 may utilize such information as the identity of the application making the write request, the time during which the application making the write request has been running, the file or target destination for the data of the write request, characteristics of other write commands or read commands in the recent past, characteristics of write commands or read commands presently in the command queue and/or temporal patterns. With respect to pending read and write commands (input/output commands), system 20 may select the presently received write command based upon the frequency at which write commands or the frequency at which both write and read commands are presently being made as indicated by the commands in the command queue. For example, write commands that are received during an extremely short period of time, with a high frequency, are more likely to direct or request the writing of smaller quantities of data and are therefore better candidates for aggregated writing execution. Write commands that are received along with read commands during a short period of time, with a high frequency, may indicate that the write commands are being from a single application and may be related to one another so as to be strong candidates for caching and subsequent aggregate writing.

As indicated by block 108, filter driver 28 caches or stores the cache subset of write commands. Those write commands that are not cached are executed as individual writes 37 to solid-state storage medium 24. Each of the individual writes 37 writes data to an individual storage region 30 during a dedicated write cycle As indicated by block 110, filter driver 28 aggregates the execution of the cached write commands 39 to a single write cycle to write all of the data for the cached write commands to a single storage region 30. The aggregated writing pursuant to the subset of write commands filtered out in block 106 and cached in block 108 occurs within the boundaries of a single one of the storage regions 30. In one implementation, the "emptying" of the cache and the aggregated writing execution is automatically triggered based upon the aggregated data for the filtered subset of write commands utilizing a predefined percentage of the individual storage region. For example, the aggregated writing may be triggered upon the total amount of data to be written pursuant to the subset of write commands being greater than or equal to a predefined percentage of the size of a storage region 30.

In another implementation, the "emptying" of the cache and the aggregated writing execution is automatically triggered based upon a cache delay time, the amount of time during which an individual write command or the subset of write commands have resided in the cache. For example, the aggregated writing may be triggered based upon the total time during which the oldest write command has resided in the cache (the write command having the longest cached time) exceeding a predefined time threshold. By way of another example, the aggregated writing may be triggered based upon an average of the cache residence times of all of the current subset of write commands, a cache residence time of a median write command in the current cache or some other statistical value derived from the cache residence times of the individual write commands in the cache. In other implementations, the triggering of the aggregated write may be based upon a combination of cache residence times data size or may be based upon other triggering parameters.

Figure 3:
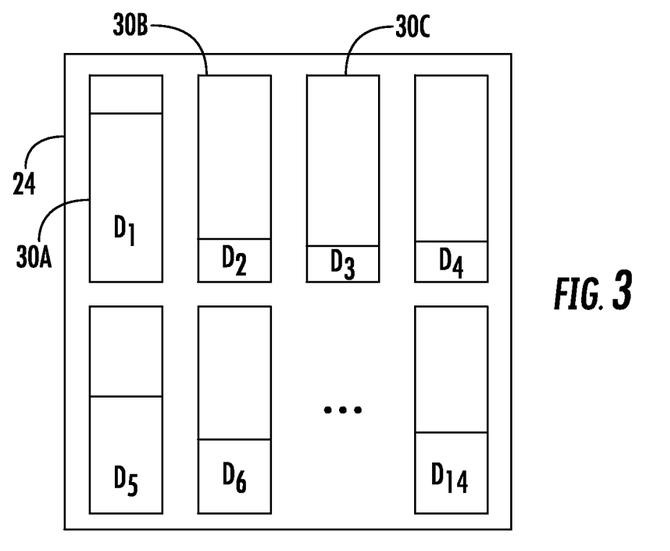
FIG. 3 is a diagram schematically illustrating an example of solid-state data storage without the write command filtering of the method of FIG. 2.
Figure 4:
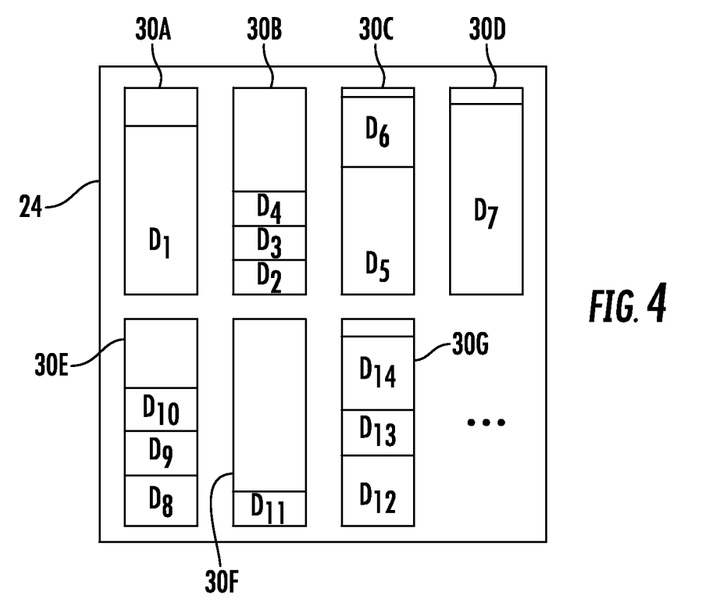
FIG. 4 is a diagram schematically illustrating an example of solid-state storage with the write command filtering of the method of FIG. 2.

FIGS. 3 and 4 illustrate how system 20 more effectively utilizes each write cycle to reduce the number of write cycles to store a given quantity of data and thereby mitigate wear of the solid-state storage medium 24. In the example shown in FIGS. 3 and 4, as well as throughout this disclosure, data written pursuant to an individual write command means new data in the case where the new data is to be written to an empty file and means new data plus existing data in the case where the new data being added by the individual write command is to be appended to existing data in a file. FIG. 3 schematically illustrates an example solid-state storage medium 24, where writing to solid-state storage medium 24 is not managed pursuant to method 100, but where each write operation is associated with an entire storage region 30 dedicated to the one write operation. As shown by FIG. 3, data D1 written pursuant to a first write command occupies storage region 30A, data D2 written pursuant to a second write command occupies storage region 30B, data D3 written pursuant to a third write command occupies storage region 30C and so on. As a result, the illustrated example 14 write commands utilize 14 storage regions 30.

Moreover, in circumstances where a write command was adding data to an existing file, the storage region containing the existing file is also invalidated and set aside for subsequent erasure while the new data being written to the write command and the old data in the existing file are written to a new storage region. For example, a storage region may have a file abc.log of size 0, where 100 bytes are committed and saved. If a write command request that 100 more bytes be saved to the file, the original 100 bytes is copied and added to the new 100 bytes, or in the 200 bytes is saved into a new region. The old region containing the original 100 bytes is invalidated putting queue for erasure. This process is repeated each time data is added or appended to a file. Because the 14 write commands utilize 14 different storage regions, the example described with respect to FIG. 3 may also queue up to 14 storage regions for erasure, depending upon the number of write commands which are appending data to an existing data in an existing storage region. Because "used" regions become invalidated and are set aside for erasure and subsequent reuse, a circumstances may occur where all available storage regions are "used" due to some of the otherwise available, but presently invalidated storage regions awaiting erasure. As a result, bottlenecks and wear rates may be exacerbated due to the solid-state storage device being unable to keep up with the workload.

By way of comparison, FIG. 4 schematically illustrates the same example solid-state storage medium 24, where data is written to the same solid-state storage medium 24 pursuant to the same 14 write commands described with respect to FIG. 3. In contrast to the writing of data to solid-state storage medium 24 as shown in FIG. 3, the writing of data to solid-state storage medium 24 in FIG. 4 is managed by system 20 according to method 100 Subsets of write commands are filtered by filter driver 28 according to criteria, cached together and coalesced for aggregated writing to within the boundaries of single storage regions. In the example illustrated, storage regions 30A and 30D each contain data corresponding to a single write command. The data D1 and D7 were written pursuant to the first write command and the seventh write command, respectively, and were identified by filter driver 28 as being of sufficient size (the amount of new data and any existing data (if any) in the file to which the new data is being appended filling a predefined threshold percentage of a storage region and/or satisfying a predetermined minimum size threshold) such that the first write command and the seventh write command were not filtered for caching, but were written directly to solid-state storage medium 24 during individual dedicated write cycles.

Storage regions 30B, 30C, 30E and 30G each contain data from a subset of commands which was filtered, cached an aggregately written to the respective storage region. The data D2, D3 and D4, written pursuant to the second, third and fourth write commands, respectively, was small enough and related such that filter driver 28 filtered out and cached each of the second, third and fourth write commands before subsequently emptying the cache to the same storage region 30B. Upon receipt of the write command corresponding to data D5, system 20 emptied the current cache which resulted in the writing of data D2, D3 and D4 due to the size of data D5 being sufficiently large such that its possible aggregation with data D2, D3 and D4 would exceed the size of storage region 30B. However, in the example illustrated, the fifth write command corresponding to data D5 was cached with the sixth write command corresponding to data D6, where data D5 and D6 were written to the same storage region 30C.

In the example illustrated, storage region 30F contains data from a single write command despite the size of the data occupying a very small percentage of the storage region 30F. Although the size of data D11 may have been sufficiently small such that it could have been cached with the eighth, ninth and $10^{th}$ write commands which were written to storage region 30E, data D11 was not identified by system 20 as being sufficiently related to data D8, D9 or D10 such that system 20 did not cache the $11^{th}$ write command with the eighth, ninth and $10^{th}$ write commands. Likewise, the $12^{th}$ write command, the $13^{th}$ write command and the $14^{th}$ write command, directing the writing of data D12, D13 and D14 were not cached with the write command by system 20. In one scenario, system 20 may have identified the $11^{th}$ write command and its associated data D11 as also not being sufficiently related to data D12, D13 or D14. In another scenario, the $11^{th}$ write command may have been cached and may have resided in the cache for a sufficient amount of time such that the cache was automatically emptied to storage region 30F prior to receipt of the $12^{th}$ write command. In yet another scenario, the $11^{th}$ write command and its associated data D11 may have been of a type preselected by the user or according to default settings as not being eligible for caching such that the $11^{th}$ write command was automatically written immediately and directly to solid-state storage medium 24.

As show by the comparison of FIGS. 3 and 4, when the writing of the 14 write command is not managed pursuant to method 100, the example 14 write commands utilize 14 storage regions and consume 14 write cycles. The same 14 write commands, when filtered and managed by filter driver 28 pursuant to method 100 utilize seven storage regions and consume seven write cycles. As a result, system 20 and the use of method 100 reduce wear of solid-state storage medium 24 and prolong the useful life of solid-state storage medium 24.

Figure 5:
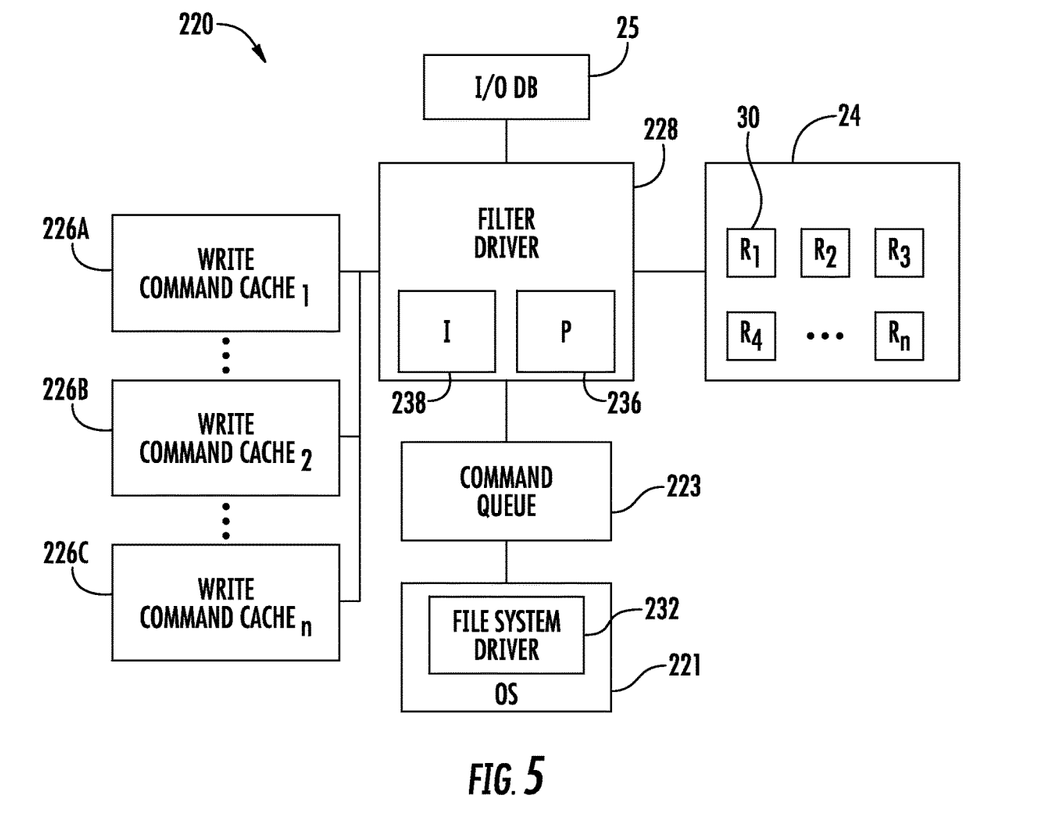
FIG. 5 schematic diagram of another example solid-state storage system for write command filtering.

FIG. 5 schematically illustrates solid-state storage system 220, another example implementation of solid-state storage system 20. Solid-state storage system 220 comprises operating system 221, command queue 223, solid-state storage medium 24 (described above), input/output (I/O) database 25, write command caches 226A, 226B, 226C (collectively referred to as caches 226) and filter driver 228. Operating system 221 manages computer hardware and software resources. In the example illustrated, operating system 221 comprises a file system driver 232. File system driver 232 interprets the structures of the file system and provides a logical hierarchical view to applications transmitting I/O commands. Command queue 223 temporarily stores received I/O commands as such commands await processing by filter driver 228

I/O database 25 comprises a non-transitory computer-readable medium or persistent storage device that stores characteristics or parameters of I/O commands received by filter driver 228. Filter driver 228 accesses information regarding previously received I/O commands contained in database 25 when filtering out subsets of write commands according to certain criteria. Write caches 226 comprise multiple non-transient computer-readable media or memories that temporarily store cached subsets of write commands filtered out by filter driver 228 for subsequent aggregate writing.

Filter driver 228 is similar to filter driver 28 described above. Filter driver 228 comprises processor (P) 236 and instructions (I) 238. Processor 236 comprises a processing unit that operates pursuant to the instructions 238. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, filter driver 228 may be embodied as part of one or more application-specific integrated circuits (ASICs). Unless otherwise specifically noted, the filter driver is not limited to any specific combination of hardware circuitry and software, nor to any particular source for the instructions executed by the processing unit.

Instructions 238 are provided as part of a non-transit computer-readable medium, in the form of code, integrated circuitry or the like. Instructions 238 direct processor 236 to carry out method 300 shown in FIG. 6. In operation, file system driver 232 transmits I/O commands, both read and write commands, to solid-state storage medium 24. Such commands are queued in command queue 223 prior to being received and analyzed by filter driver 228.

Figure 6:
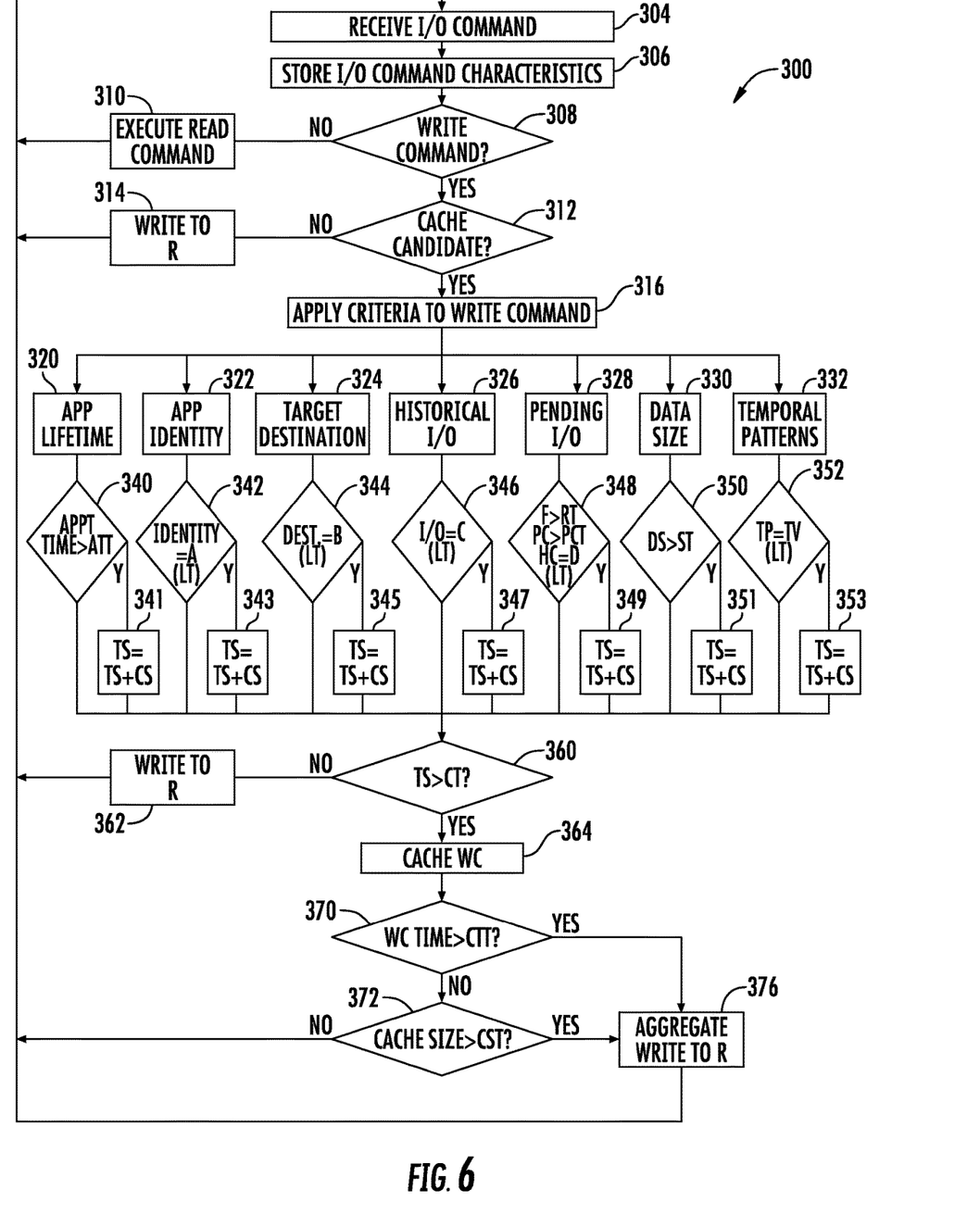
FIG. 6 is a flow diagram of another example solid-state storage method for filtering write commands FIG. 7 the flow diagram of an example method for assigning write commands to different caches.

As indicated by block 304, filter driver 228 receives the I/O commands from the command queue 223. As indicated by block 306, for each received I/O command received, filter driver 228 analyzes and stores characteristics or parameters of the I/O command in I/O database 25. Such characteristics or parameters are utilized by filter driver 228 when selecting write commands for filtering and caching pursuant to certain criteria.

As indicated by decision block 308, filter driver 228 determines whether or not the received I/O command is a write command. If the I/O command is not a write command, but is a read command, filter driver 228 causes execution of the read command in block 310, prior to receiving the next I/O command pursuant to block 304.

As indicated by decision block 312, if the I/O command is a write command, filter driver 228 determines whether the particular write command is eligible as a candidate for caching and aggregate writing. In one implementation, the driver 228 consults a memory or database storing predefined I/O commands pre-established as not being eligible for caching. For example, certain commands may be identified by a user as to be immediately written to a storage region without the possibility for caching. As indicated by block 314, those commands which are not cache candidates are immediately written to the storage region R. As indicated by block 316, all other write cache commands are analyzed, where criteria supplied to determine whether the particular write command is to be cached for aggregate writing.

In the example illustrated, filter driver 228 applies multiple different criteria to a received write command, each criteria being weighted to determine total score which is compared against a cache threshold to determine whether an individual write command should be cached for aggregate writing. In the example illustrated, filter driver 228 applies seven different criteria: application lifetime 320, application identity 322, target destination 324, historical I/O 326, pending I/O 328, data size 330 and temporal patterns 332. In other implementations, filter driver 228 may apply less than each of noted criteria or may apply additional or alternative criteria when determining whether a write command should be cached along with other write commands for aggregate writing.

Application lifetime criteria 320 pertains to the length of time that the application supplying the write command has been running. In one implementation, filter driver 28 communicates with operating system 221 to determine total length of time that which the application requesting the write command has been running. For example, write commands being issued by an application that has been running for a relatively short time may be, in some circumstances, more likely to be shorter in length and/or may be more likely to be related to other write commands recently received by filter driver 228, making the write command a good candidate for caching. In such circumstances, filter driver 228 utilizes the determined runtime of the application at the time that the write command is received as a factor in determining whether the write command should be cached.

As indicated by decision block 340, in one implementation, filter driver 228 compares the received application runtime to a predefined threshold, application total time ATT. As indicated by block 341, in circumstances where the application runtime exceeds the predefined threshold, the total score TS for the write command is incremented by a weighted caching score CS. In other implementations, filter driver 228 may consult a lookup table LT or other memory having different criteria scores associated with different times or ranges of times for the running of the application making the write command request. In some implementations, the identity of the application may also factor into the weighted caching score or what application total time threshold that is applied.

Application identity 322 pertains to the actual identity of the application making the write command. In one implementation, filter driver 228 communicates with operating system 221 to learn the identity of the application making the write command or identifies the identity of the application from portions of the write command itself. In one implementation, the application identity may be determined from an application thumbprint. The application identity may indicate not only the program itself, but the version of the application or program making the write command request. Some applications or some versions of an application may be more likely to issue write commands for writing smaller quantities of data or for writing multiple pieces of data related to one another and are therefore good candidates for caching for aggregate writing. On the other hand, other applications may be more likely to issue write commands writing larger quantity data or writing unrelated pieces of data which may not be good candidates for caching for aggregate writing.

As indicated by decision block 342, in one implementation, filter driver 228 consults a lookup table LT or other memory associating different applications or application versions to different application identity caching scores CS. As indicated by block 343, should the identity of the application issuing the write command be identified as being associated with a certain application identity caching score, filter driver 228 increments the total score for the write command by the caching score associated with the application identity.

Target destination 324 pertain to the type of file or name of the file being opened or a type of file access pursuant to the issued write command. For example, a write command requesting that data be returned to a particular file type or a particular file name may be previously determined as being more likely to be smaller in size or be related to other similar smaller sized data writes such that the write command is a better candidate for caching and aggregate writing. Based upon the type of the file to which data is to be written or the name of the file to which data is to be written, filter driver 28 may assign a larger or smaller target destination criteria score.

As indicated by block 344, in one implementation, filter driver 228 consults a lookup table or other memory associating different file types and/or different file names with different caching scores CS. As indicated by block 345, should the identity of the file in written to be identified as being associated with a certain caching score, filter driver 228 increments the total score for the write command by the weighted target destination caching score associated with the file identity or file type.

Historical I/O 326 pertains to historical data or characteristics of the I/O commands received by filter driver 228, including those I/O commands that have already been executed, where such commands have been cached and executed as part of an aggregate write or whether such commands have been immediately executed. Such historical I/O commands may include characteristic of both received read and write commands. Certain read commands and/or certain write commands previously received and executed, within a predefined range of time from the receipt of the current write command, may be predetermined or historically identified as indicating characteristics of the current write command being analyzed. For example, certain read commands and/or certain write commands previously received and executed may indicate that the current write command is more likely to be shorter in length or related to other write commands that may also already be cached and therefore good candidate for caching and subsequent aggregate writing. In contrast, other read commands or other write commands previously received and executed, within a predefined range of time from the receipt of the current write command may alternatively indicate that the current or present write command being analyzed is larger in size or is probably unrelated to other commands that are presently cache such that the current write command is not a good candidate for caching and subsequent aggregate writing. In one implementation, those historical I/O commands that are analyzed generally fall within a range of time of the receipt of the present I/O command being analyzed during a time frame on the order of seconds and minutes.

As indicated by block 346, in one implementation, filter driver 228 consults a lookup table or other memory associating different historical I/O commands and/or different patterns of historical if commands with different caching scores CS. As indicated by block 347, should the identity of historical I/O commands or pattern of historical I/O commands to be identified as being associated with a certain caching score, filter driver 228 increments the total score for the write command by the weighted caching score associated with the historical I/O commands or historical I/O command pattern.

Pending I/O 328 pertains to data or characteristics of the I/O commands received by filter driver 228 that are pending. In one implementation, the characteristics of I/O commands in command queue 223 are analyzed. For example, filter driver 228 may determine the characteristics of the I/O commands, including both read and write commands, in command queue 223. In another implementation, the characteristics of write commands that have been recently cached and are currently residing in one of caches 226 are analyzed. Certain read commands and/or certain write commands in the command queue while the current write command is being analyzed, may be predetermined or historically identified as indicating characteristics of the current write command being analyzed. For example, certain read commands and/or certain write commands in the current command queue may indicate that the current write command is more likely to be shorter in length or related to other write commands that may also already be cached and therefore good candidate for caching and subsequent aggregate writing. In contrast, other read commands or other write commands in the current command queue may alternatively indicate that the current or present write command being analyzed is larger in size or is probably unrelated to other commands that are presently cache such that the current write command is not a good candidate for caching and subsequent aggregate writing. The same may be said for those write commands that are presently residing in a cache while the current write command is being analyzed.

As indicated by block 348, in one implementation, filter driver 228 con a lookup table or other memory associating different pending I/O commands PC and/or different patterns of pending I/O commands with different caching scores CS. As indicated by block 349, should the identity of pending I/O commands or pattern of pending I/O commands to be identified as being associated with a certain caching score, filter driver 228 increments the total score for the write command by the weighted pending I/O caching score associated with the pending I/O commands or pending I/O command pattern.

In other implementations, the actual total number of I/O commands, both read and write, residing in the command queue, the number of specific read commands within the command queue 223, the number of specific write commands within the command queue 223 and/or the number write commands In one or more of write command caches 226 is analyzed to determine whether the current write command being analyzed is a good candidate for caching and subsequent aggregate writing. For example, a large number of I/O commands in the command queue 223 may indicate that the I/O commands are being received at high frequency or rate and therefore may be smaller in size as well as may be related to one another such that the current write command is also more likely to be smaller in size or be related to have to be a good candidate for caching and aggregate writing. In one implementation, those pending I/O commands that are analyzed generally fall within a range of time of the receipt of the present I/O command being analyzed during a time frame on the order of microseconds.

As indicated by block 348, in one implementation, filter driver 228 compares the frequency F at which the pending I/O commands have been received, partially based upon the number of pending I/O command in the command queue for the number write commands any of the caches against a predefined frequency threshold FT. As indicated by block 349, should the frequency threshold be satisfied, filter driver 228 increments the total score by the caching score associated with the threshold being satisfied. In one implementation, filter driver 228 may compare the I/O frequency against multiple different thresholds, where each different threshold has an associated different criteria score. In yet other implementations, instead of comparing the frequency against the frequency threshold, filter driver 28 may alternatively compare the total number of I/O commands presently in the command queue and/or the total number of write commands presently in any of the caches 226 against a count threshold or multiple different count thresholds to determine what weighted caching score to be added to the total score for the write command being analyzed.

Data size 330 pertains to the size or amount of data which is to be written pursuant to the write command being analyzed. In such an implementation, filter driver 228 communicates with operating system 221 or otherwise determine the size or amount of data associated with the write command being analyzed. As described above, write commands that are good candidates for caching and subsequent aggregate writing or write commands for smaller amounts or quantities of data as they are more likely to fit within the boundaries of an individual storage region and would result in the least efficient use of the space of a storage region if written alone in a storage region. Write commands having smaller amounts of associated data are also less likely to extend beyond or exceed the boundaries of a storage region when combined with the data of other cached write commands As indicated by block 350, in one implementation, filter driver 228 compares the size or amount of data associated with the write command being analyzed against a predefined size threshold ST. As indicated by block 351, in response to the size of the write command DS exceeding the size threshold ST, filter driver 228 increments the total score by a weighted data size caching score CS based upon the data size criteria 330. In yet another implementation, filter driver 228 compares the size or amount of data associated with the write command against multiple different thresholds, each different threshold having a corresponding different data size criteria score CS. In still other implementations, filter driver 228 compares the size or amount of data associated with the write command being analyzed against a memory table associating different data sizes with different data size caching scores to determine the data size caching score by which the total score should be implemented.

Temporal patterns 332 pertains to timing characteristics associated with the write command being analyzed. For example, when applying temporal patterns criteria 332, filter driver 228 considers the time of the day at which the write command was received, the day of the week that the write command was received and/or other timing characteristics associated with the write command. Based upon historical or empirical data, write commands may be more or less likely to be good candidates for caching and aggregate writing (smaller in size and related to other cached files) based upon their timing characteristics.

As indicated by block 352, in one implementation, filter driver 228 consults a lookup table LT which associates different timing characteristics with different temporal pattern caching scores. For example, if a temporal pattern TP associated with the current write command being analyzed matches timing value TV in lookup table, filter driver 228 increments the total caching score or total score TS for the write command by the weighted temporal pattern caching score CS as indicated by block 353.

As indicated by decision block 360, once each of the criteria has been applied to the write command, filter driver 228 compares the resulting total score TS against a predefined caching threshold CT to make a determination as to whether the write command should be cached. As indicated by block 362, in response to the total score not satisfying the predetermined caching threshold, filter driver 228 immediately writes the write command to the storage region R. As indicated by block 364, if the total score for the write command exceeds the caching threshold of decision block 360, filter driver 228 caches the write command WC to the write command cache for subsequent aggregate writing.

In the example illustrated, system 220 comprises multiple different write command caches 226. In such an implementation, filter driver 228 may selectively assign the write command to one of the write command caches 226 based upon one or more of the criteria 320, 322, 324, 326, 328, 330, 332. For example, based upon the applied criteria, filter driver 228 may determine that a particular write command being analyzed is more likely to be related to or associated with write commands currently cached in cache 226B as compared to the write commands in the other write command caches 226A and 226C. In other words, filter driver 228 selectively groups or associates write commands having similar characteristics or those that are more likely to be related to one another based upon the criteria applied in block 316 when such commands are being cached. As a result, the write commands being cached and written to an individual storage region may be more closely related to one another.

In one implementation, filter driver 228 additionally tracks the total amount of data associated with the write commands in each of the caches 226. In such an implementation, for each write command being analyzed, filter driver 228 selects the individual write command cache path is most appropriate to receive the write command based upon the current total amount of data to be written pursuant to the write commands of each write command cache. For example, the write command cache that has a smaller amount of total data may be determined to be a better caching destination for a write command as compared to the other write command caches with may presently have larger total amount of data.

In yet another implementation, filter driver 228 may additionally consider the size of the data associated with the write command being analyzed. Filter driver 228 may consider the size of the data of the write command being analyzed and the amount of available space within each of the write command caches so as to determine whether the write command will fit within any of the write command caches and/or determine which write command cache should receive the write command to most effectively fill the available space of a write command cache or a storage region. For example, a particular write command have an associated data size that will result in a particular write command cache and subsequently written upon storage region being more completely filled, such that filter driver 228 will assign the particular write command to the particular write command cache.

Figure 7:
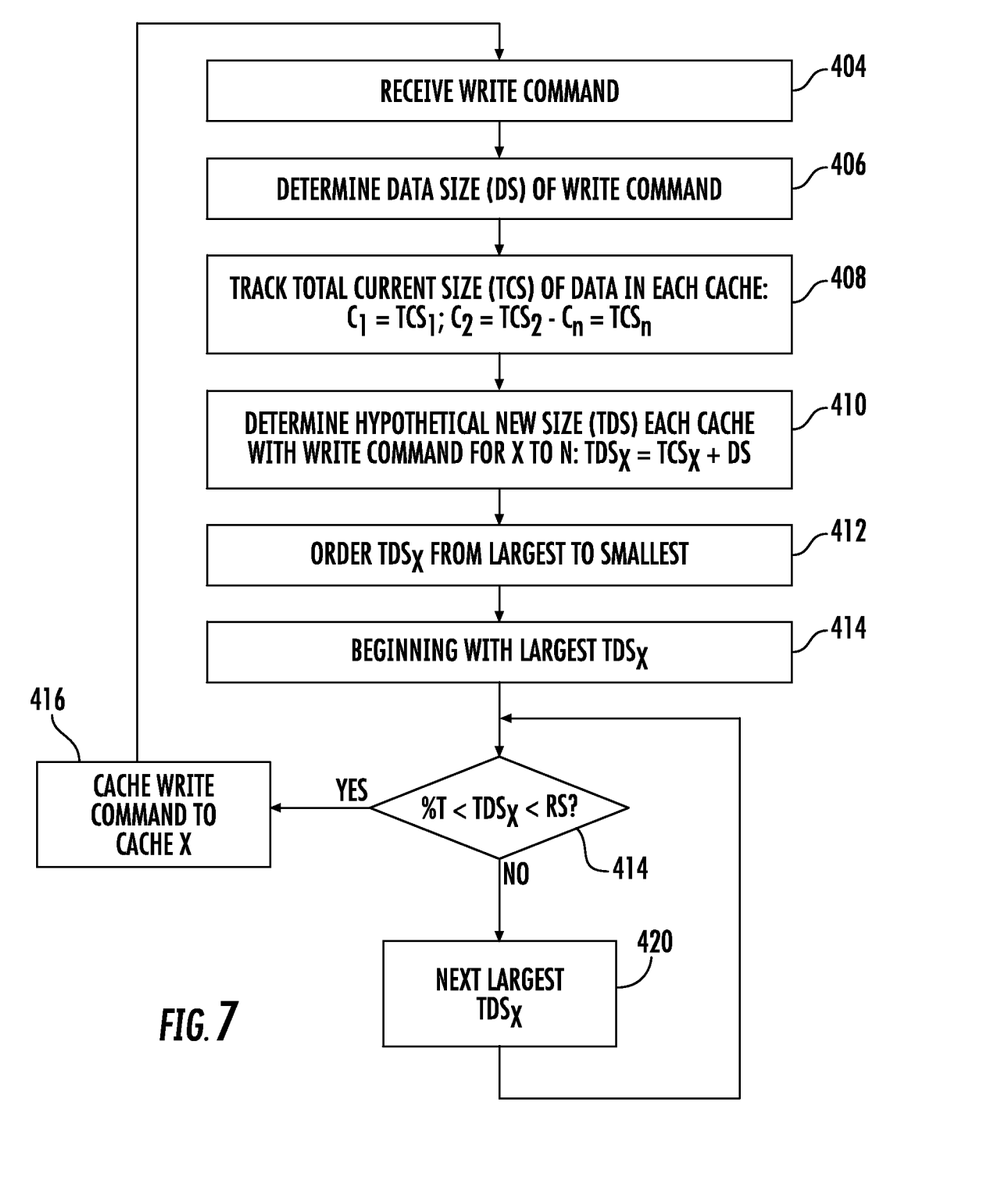

FIG. 7 is a flow diagram of one example method 400 that may be carried out by filter driver 228 in determining to which of caches 226 a write command should be assigned. In other implementations, other criteria or methods may alternatively be used to determine to which cache a write command is to be assigned. As indicated by blocks 404 and 406, filter driver 228 receives the write command and determines the size of the data OS associated with the write command.

As indicated by block 408, filter driver 228 tracks the total current size TCS of each of the write command caches 226 ($C_1$-$C_n$). As indicated by block 410, for each cache 226. filter driver 228 determines the hypothetical new total data size IDS if the write command received in block 404 were added to the individual cache. As indicated by block 412, filter driver 228 then orders the caches, from largest to smallest, based upon their hypothetical new total data sizes TDS.

As indicated by block 414 and decision block 416, beginning with cache having the largest hypothetical total data size, filter driver 228 compares the total data size TDS of the cache against the region size RS to ensure that the amount of data in the cache would not exceed the size of the region for which the aggregate write would occur. Filter driver 228 further compares the total data size of the cache against a predefined fill percentage threshold % T. In one implementation, the fill percentage threshold % T comprises a predetermined percentage of the total size of a storage region. In other implementations, a data size threshold may alternatively be used instead of the fill percentage threshold. In some implementations, the threshold may be alternatively based on a percent fill of the size of a cache which itself is proportional to the size of the storage region. As indicated by block 416, if total data size TDS for the particular cache x satisfies both thresholds, filter driver 428 caches the current write command to the particular cache x. As indicated by block 420, if total data size TDS for the particular cache x fails to satisfy both thresholds, (it is too large for the region size or does not satisfactorily fill the space of a storage region), filter driver 228 proceeds to carry out the same analysis respect to the cache having next largest hypothetical new total data size TDS.

As shown by FIG. 6, method 300 further comprises a determination of when to perform an aggregate write, when to "empty" a cache by executing the write commands presently in the cache in writing the data to a single storage region. In the example illustrated, filter driver 228 applies two criteria for determining when to empty a cache. As indicated by decision block 370, in one implementation, filter driver 228 evaluates a write command time against a cache time threshold CTT. In one implementation, the write command time may comprise individual residency time for each write command in the cache, where if even one write command has a cache residency time that exceeds the cache time threshold CTT, decision block 370 is satisfied. In another implementation, the write command time, that is compared against the cache time threshold, may comprise a value based upon a statistic based upon cache residency times for a subset of the write commands in the cache or based upon an aggregation of all of the write commands within the cache. For example, the write command time, that is compared against the cache time threshold, may comprise a median or average of the residency times of the write commands in the cache. In yet another implementation, the write command time comprises a lapse of time since receipt of a prior individual write command by the cache.

As indicated by decision block 372, should decision block 370 be satisfied, as in the case where the write command does not exceed the cache time threshold, filter driver 228 proceeds by evaluating the size of the cache. In the example illustrated, filter driver 228 compares the size of the cache to a predetermined cache size threshold CST. For example, at a certain point, a cache may be sufficiently filled such that it may be determined as being ready for "emptying" to an aggregate write operation. In one implementation, "emptying" the cache to an aggregate write operation is triggered in response to the size of the cache completing filling or equaling the data storage capacity or size of the storage region. In other implementations, "emptying" the cache to an aggregate write operation is triggered in response to the size of the cache being a certain percentage of the data storage capacity of the storage region. For example, in one implementation, such "emptying" is triggered in response to the size of the cache being at least 60%, and nominally 80%, of the data storage capacity of the storage region.

If neither of the criteria in decision blocks 370, 372 are satisfied, filter driver 228 proceeds to the next I/O command from command queue 223. If either of the criteria of the decision blocks 370 or 372 are satisfied, filter driver 228 empties the cache by performing an aggregate write operation to a storage region R as indicated by block 376. Although the criteria of decision block 370 is illustrated as having a greater priority as compared to the criteria decision block 372, in other implementations, the order of such decision blocks may be reversed. In still other implementations, other criteria may be applied for determining when to empty a cache form aggregate writing to a storage region.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", second "second", "third" and so on in the claims merely distinguish different elements and, unless otherwise stated, are not to be specifically associated with a particular order or particular numbering of elements in the disclosure.

What is claimed is:

1. A method comprising:
   receiving a set of write commands for a solid-state storage medium having storage regions;
   filtering out a subset of the set of write commands according to a criterion;
   caching the subset of write commands;
   aggregating writing pursuant to the subset of write commands to within boundaries of one of the storage regions of the solid-state storage medium;
   monitoring a total amount of data to be written pursuant to the subset of write commands currently cached; and
   transmitting the cached subset of write commands to the solid-state storage medium for the aggregated writing, wherein the cached selected write commands are transmitted to the solid-state storage medium for the aggregated writing at a time based upon the total amount of data, wherein the criterion is applied to each individual write command of the received write commands and wherein the criterion comprises an amount of data to be written pursuant to each individual write command.

2. The method of claim 1, wherein the cached selected write commands are transmitted to the solid-state storage medium for the aggregated writing at a time that is based upon a cache delay of at least one of the write commands.

3. The method of claim 2, wherein the cached selected write commands are transmitted to the solid-state storage medium for the aggregated writing at a time that is based upon a longest cache delay of any individual cached write command.

4. The method of claim 1, wherein said one of the storage regions has a data storage capacity and wherein the cached selected write commands are transmitted to the solid-state storage medium for the aggregated writing in response to a total amount of data of the cached selected write commands being at least 60% of the data storage capacity.

5. The method of claim 1, wherein the received write commands are filtered, one by one, in order and as they are received.

6. The method of claim 1, wherein the criterion comprises at least one criterion selected from a group of criteria consisting of:
   application lifetime, application version, application thumbprint, pending input/output (I/O) requests, temporal patterns in I/O operation and type of file being accessed.

7. The method of claim 1, wherein the criterion is applied to each individual write command of the received write commands and wherein the criterion applied to each individual write command comprises a lapse of time since receipt of a prior individual write command.

8. The method of claim 1, wherein each of the storage regions comprises a smallest unit of the storage medium that may be individually acted upon during a single write cycle.

9. The method of claim 1, wherein the criterion comprises at least one criterion selected from a group of criteria consisting of: application lifetime, application version, application thumbprint, temporal patterns in I/O operation, type of file being accessed, and type of a file access being performed.

10. The method of claim 1, wherein the subset of write commands comprises three write commands and wherein the subset of write commands are written in less than three write cycles.

11. A solid-state storage system comprising:
    a solid-state storage medium having storage regions; and
    a filter driver to:
      receive write commands for writing to the solid-state storage medium;
      filter out selected write commands according to a criterion, wherein the criterion is applied to each individual write command of the received write commands and wherein the criteria comprises an amount of data to be written pursuant to each individual write command;

cache the selected write commands; and facilitate aggregated writing of data, pursuant to an aggregate of the selected write commands, to within boundaries of one of the storage regions of the solid-state storage medium.

12. The system of claim 11, wherein the criterion comprises at least one criterion selected from a group of criteria consisting of:

application lifetime, application version, application thumbprint, pending input/output (I/O) requests, temporal patterns in I/O operation, type of file being accessed, and type of a file access being performed.

13. The system of claim 11, wherein each of the storage regions comprises a smallest unit of the storage medium that may be individually acted upon during a single write cycle.

14. The system of claim 11, wherein the criterion comprises at least one criterion selected from a group of criteria consisting of: application lifetime, application version, application thumbprint, temporal patterns in I/O operation, type of file being accessed, and type of a file access being performed.

15. A non-transitory computer-readable medium comprising instructions to direct a processor to:

receive write commands for writing to a solid-state storage medium having storage regions;

filter out selected write commands according to a criterion;

cache the selected write commands;

facilitate aggregated writing of data, pursuant to an aggregate of the selected write commands, to within boundaries of one of the storage regions of the solid-state storage medium; and transmit the cached subset of write commands to the solid-state storage medium for the aggregated writing wherein said one of the storage regions has a data storage capacity and wherein the cached selected write commands are transmitted to the solid-state storage medium for the aggregated writing in response to a total amount of data of the cached selected write commands being at least 60% of the data storage capacity, wherein the criterion is applied to each individual write command of the received write commands and wherein the criterion comprises an amount of data to be written pursuant to each individual write command.

16. The non-transitory computer-readable medium of claim 15 further comprising instructions to direct the processor to transmitting the cached selected write commands to the solid-state storage medium for the aggregated writing.

17. The non-transitory computer-readable medium of claim 15, wherein the criterion comprises at least one criterion selected from a group of predefined criteria consisting of: application lifetime, application version, application thumbprint, pending input/output (I/O) requests, temporal patterns in I/O operation, type of file being accessed, and type of a file access being performed.

* * * * *